(No Model.)
D. R. PORTER & R. S. WHITTIER.
TWO-FOOT RULE.
No. 549,745.    Patented Nov. 12, 1895.
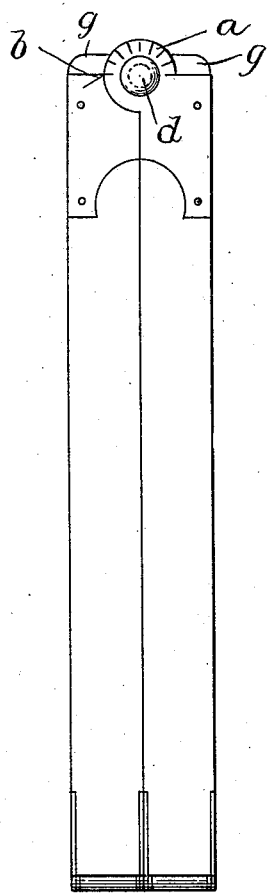
Fig. 1.
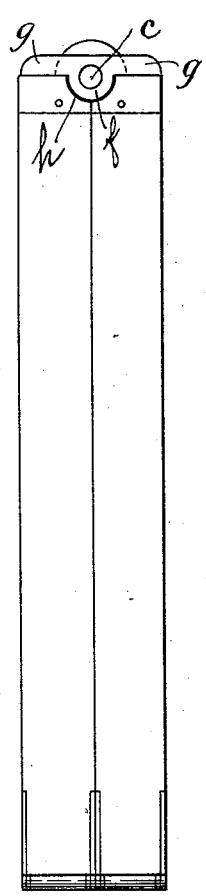
Fig. 2.
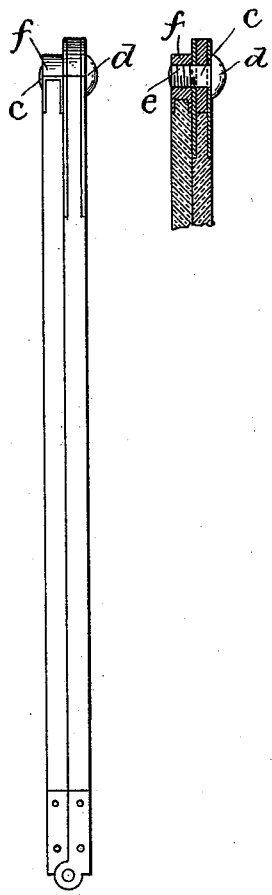
Fig. 3.   Fig. 4.
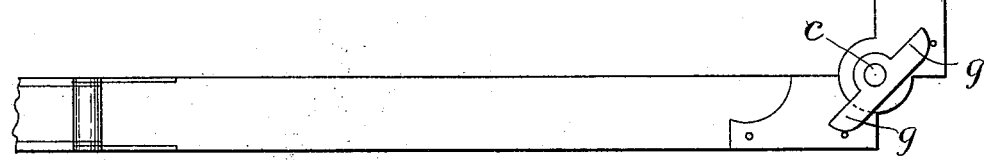
Fig. 5.
WITNESSES:
A. D. Hanson
Rollin Abell
INVENTORS
Daniel R. Porter and Reuben S. Whittier
by Wright Brown & Quinby
Attys.

UNITED STATES PATENT OFFICE.

DANIEL R. PORTER AND REUBEN S. WHITTIER, OF CHELSEA, ASSIGNORS, BY MESNE ASSIGNMENTS, TO MELVILLE P. HAYWARD, OF SUFFOLK COUNTY, MASSACHUSETTS.

TWO-FOOT RULE.

SPECIFICATION forming part of Letters Patent No. 549,745, dated November 12, 1895.

Application filed March 21, 1895. Serial No. 542,592. (No model.)

*To all whom it may concern:*

Be it known that we, DANIEL R. PORTER and REUBEN S. WHITTIER, of Chelsea, in the county of Suffolk and State of Massachusetts, have invented certain new and useful Improvements in Two-Foot Rules, of which the following is a specification.

This invention relates to improvements in the common two-foot four-fold carpenters' or pocket rule; and it consists in graduating radially the flange of the middle joint with the degrees of a circle, means for locking the said joint in any desired position and rabbeting the inner corners of the ends of the rule to clear the locking mechanism when the rule is folded.

Of the accompanying drawings, forming a part of this specification, Figure 1 is a view of the folded rule, showing the middle portion and the graduated flange. Fig. 2 is a like view showing the end portions and the locking mechanism. Fig. 3 is an edge view of the folded rule. Fig. 4 is a section of the joint and locking mechanism. Fig. 5 shows the rule opened and set for use.

In the drawings like characters indicate like parts in all the figures.

$a$ is the graduated flange, and $b$ a co-operating index upon the adjacent member of the joint, whereby the legs of the rule may be set at or used to measure any desired angle.

$c$ is the pin or journal of the joint $d$, the head thereof abutting against the outer or graduated surface of the joint.

The projecting inner end $e$ of the pin or journal is screw-threaded to receive the locking-nut $f$, having the wings or arms $g\ g$ offset beyond the center of the nut to clear the ends of the rule when folded and of a length equal to the width of the folded rule for the purpose of affording a sufficient leverage upon the nut to permit the joint to be securely locked in the desired position, the said nut and the wings thereof being in thickness equal to the thickness of the rule, the purpose of thus limiting the dimension of the nut being to avoid any projection extending beyond the normal extreme dimension of the rule.

To clear the boss or hub of the locking-nut $f$ when the rule is folded, it is necessary to rabbet or recess the end $h\ h$ of the rule, as shown.

We claim—

A three-jointed, four-fold pocket-rule having the flange of the joint graduated radially in the degrees of a circle to serve as a protractor, the co-operating index upon the adjacent member of the joint, the screw-threaded pin or journal provided with the head and thumb-nut whereby the legs of the rule may be secured in any desired relation, the said thumb-nut being of a thickness equal to that of the rule and having the arms or wings thereof equal in length to the width of the folded rule and offset to the outer side of the center of the nut to clear the ends of the rule when folded, the inner corners of the said ends being rabbeted or recessed to clear the hub of the said nut, all substantially as described and for the purpose set forth.

In testimony whereof we have signed our names to this specification, in the presence of two subscribing witnesses, this 23d day of February, A. D. 1895.

DANIEL R. PORTER.
    REUBEN S. WHITTIER.

Witnesses:
 A. D. HARRISON,
 ROLLIN ABELL.